United States Patent [19]
Knudson

[11] 3,928,691
[45] Dec. 23, 1975

[54] REINFORCED PANELS AND METHOD OF CONSTRUCTING SAME

[76] Inventor: Richard A. Knudson, P.O. Box 1393, Torrance, Calif. 90505

[22] Filed: June 17, 1974

[21] Appl. No.: 480,282

[52] U.S. Cl. .......................... 428/53; 9/6; 52/309; 52/617; 156/293; 156/304; 428/54; 428/61; 428/131
[51] Int. Cl.².. B32B 3/10; B32B 3/02; B32B 31/04; B63B 3/06
[58] Field of Search .............. 9/6, 6 R, 6 P; 161/36; 428/44, 47, 52, 61, 68, 131, 167, 53–54; 52/309, 617; 156/304, 293

[56] References Cited
UNITED STATES PATENTS

| | | | |
|---|---|---|---|
| 2,602,764 | 7/1952 | Billingham | 156/293 X |
| 2,905,579 | 9/1959 | Sumner | 156/304 X |
| 3,233,870 | 2/1966 | Gerhardt | 156/293 X |

*Primary Examiner*—Philip Dier
*Attorney, Agent, or Firm*—John Holtrichter, Jr.

[57] ABSTRACT

Upper and lower edges of polyurethane core members are provided with semi-circular grooves which extend full length thereof and which are caused to encompass iron or steel reinforcing rods when upper edge of a lower core member is sealed to the lower edge of the next higher core member. Both sides of assembled core members are covered with one or more layers of glass-cloth-type sheet material adhesively secured thereto by an epoxy resin.

8 Claims, 3 Drawing Figures

U.S. Patent  Dec. 23, 1975  3,928,691
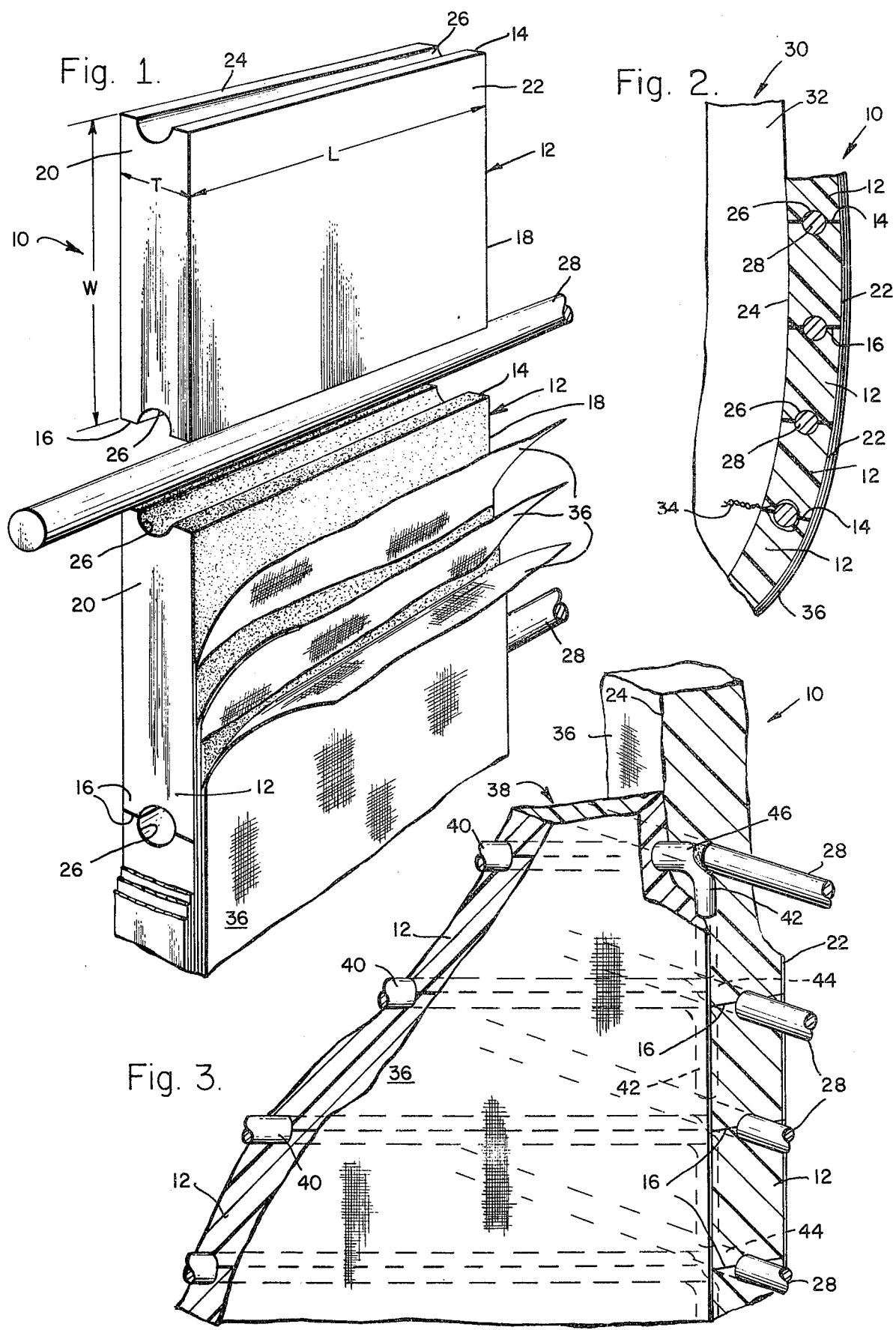

REINFORCED PANELS AND METHOD OF CONSTRUCTING SAME

BACKGROUND OF THE INVENTION

The background of the invention will be set forth in two parts.

1. Field of the Invention

The present invention pertains generally to the field of structural panels and more particularly to reinforced panels and a method of constructing same.

2. Description of the Prior Art

The prior art known to applicant is listed by way of illustration, but not of limitation, in separate communications to the United States Patent Office.

The present invention exemplifies improvements over this prior art.

OBJECTS AND SUMMARY OF THE INVENTION:

It is a primary object of the present invention to provide a new and useful structural panel.

It is another object of the present invention to provide an improved method of making reinforced panels.

A further object of the present invention is to provide a reinforced panel which may be constructed easily and inexpensively using readily-available materials.

According to the present invention, a reinforced panel comprises a plurality of core members each having edge portions provided with semi-circular grooves. Reinforcing rods are encompassed by the semi-circular grooves of pairs of core members having their edge portions sealed together in abutting relationship. Both sides of the assembled core members may then be covered with one or more layers of a suitable sheet material adhered thereto.

The core members may be made from a suitable inexpensive material of light weight. For example, strips of polyurethane foam having one-half inch diameter grooves and being one inch thick by four inches high has been found to be suitable for making boats. The reinforcing rods may be made from iron or steel and the sheet material may comprise glass cloth of the type used for making screens. The glass cloth may be adhered to the core members and the abutting edges of the core members may be sealed and bonded with an epoxy resin. The reinforcing rods are preferably placed parallel to the major axis of the panel and a suitable jig may be used for conforming the individual core members to the shape required for constructing panels having curved surfaces and the like.

According to the method of the present invention, a boat may be constructed by suspending a jig or mold having the shape of a boat hull in an upright position. A first core member having a groove along its upper edge may be placed along the lower edge of the jig. A reinforcing rod may then be placed in the groove and a second core member having grooved lower and upper edges may be placed over the reinforcing rod in abutting relation with the upper edge of the first core member and sealed thereto by an epoxy resin.

Core members and reinforcing rods would continue to be assembled in this manner while shaping the core members to the contour of the jig. The outer surface of the core members may then be covered with about three plies of glass cloth adhered thereto by epoxy resin. This will give the hull sufficient strength to permit removal of the jig so that the inner surfaces of the core members may be covered with the glass cloth.

Shaping of the core members to the contour of the jig may be facilitated by tying the reinforcing rods thereto with suitable wire bails. These bails would be severed from the jig after the glass cloth has been applied to the outer surface of the panel.

The features of the present invention which are believed to be novel are set forth with particularity in the appended claims. The present invention, both as to its organization and manner of use, together with further objects and advantages thereof, may best be understood by reference to the following description, taken in conjunction with the accompanying drawings in which like reference characters refer to like elements in the several views.

BRIEF DESCRIPTION OF THE DRAWING:

FIG. 1 is an exploded perspective view of a section of a panel of the present invention;

FIG. 2 is a partial, vertical cross-sectional view showing a panel of the present invention in position against a jig which may be used for making a boat or the like; and FIG. 3 is a partial, vertical cross-sectional view showing the construction of a boat hull and bulkhead using panels of the present invention.

DESCRIPTION OF THE PREFERRED EMBODIMENT:

Referring again to the drawing, a reinforced panel constituting a presently preferred embodiment of the invention, generally designated 10, includes a plurality of core members 12 each having an upper edge 14, a lower edge 16, a front edge 18, a rear edge 20, an outer surface 22 and an inner surface 24.

The upper edges 14 and the lower edges 16 of each core member 12 are each provided with a groove 26 having a semicircular cross section and extending from the front edge 18 to the rear edge 20 for the full length L thereof along a line lying parallel to the major axis thereof. Different materials may be used for the core members 12, depending upon the structural requirements for panel 10. For example, if panel 10 is used in constructing a boat, core members 12 may comprise strips of polyurethane foam. In such a construction, core members 12 having a thickness T of approximately one inch and a width W of approximately 4 inches have been found to be satisfactory for small boats.

Panel 10 also includes a plurality of reinforcing rods 28 made from iron or steel, or the like. Each reinforcing rod 28 is placed in a groove 26 on the upper edge 14 of a lower core member 12 and is then covered by the groove 26 provided in the lower edge 16 of the next higher core member 12. A suitable epoxy resin is then used to seal and bond abutting edges 14, 16 together in water-tight relationship with each other and with reinforcing rod 28.

When panels 10 are used for constructing curved surfaces for boat hulls and the like, a jig or mold 30 (FIG. 2) may be suspended in an upright position. Mold 30 includes a plurality of frame sections, like the one shown at 32 in FIG. 2, and the core members 12 may be pressed against each frame section 32 for conforming panel 10 to the shape of mold 30. This may be facilitated by using bails or wires 34 on reinforcing rods 28 to pull core member 12 into engagement with frame section 32. After mold 30 has been covered with the required panels 10 each formed by starting at the keel of the boat with a first core member 12, placing a reinforcing rod 28 in its groove 26 on its upper edge 14 and covering the reinforcing rod 28 with the groove 26 provided in the lower edge 14 of the next higher core 12, the outer surfaces 22 of core members 12 may be covered with several plies of a unitary sheet material 36 made from glass cloth, or the like. Sheet material 36 may be sealed and bonded to core members 12 by a suitable epoxy resin. This will give panel 10 sufficient strength to permit removing mold 30. Several plies of sheet material 36 may then be applied to the inner surface 24 of each core member 12. Three plies of sheet material 36 has been found satisfactory for making light boats and forms a unitary skin on the inner and outer surfaces of panel 10. Additionally, any exposed edges of panel 10 may also be sealed with sheet material 26, as shown in FIG. 1.

Referring now more in particular to FIG. 3, additional core members 12 may be used to construct a bulkhead 38 normal to panel 10 by using reinforcing rods 40 having depending legs 42 the lower ends 44 of which may be welded to the upper end 46 of the next lower leg 42 and the next lower reinforcing rod 28 on panel 10.

Bulkhead 38 may be installed before the sheet material 36 is applied to the inner surface of panel 10 so that sheet material 36 may be carried from the inner surface of panel 10 to the front and rear surfaces of bulkhead 38 as unitary sheets.

From the foregoing, it should be evident that the panel construction and method herein described may be used to provide a reinforced, fiber-glass, foam core construction, with reinforcing rods running longitudinally from keel to gunwale at four inch distances, or as required by testing. It should also be evident that the core construction is filled with foam strips of appropriate thickness for strength requirements and grooved so as to provide a smooth interior and exterior finish with the rods being sealed in the grooves between the foam strips and the strips themselves bonded together lengthwise with epoxy resin. The foam strips may be cut to later-determined lengths and sealed with epoxy resin to gain a separate cell construction, each sealed entirely in epoxy resin above, below and at each end. Additionally, the interior and exterior surfaces of the core construction may be covered with glass cloth and epoxy resin in sufficient layers to attain needed strength and rigidity.

Little fairing of the core members is required before applying the glass cloth because the grooves in the core members tend to fair the core construction to the desired curves for the hull shape.

In accordance with the method of the present invention, construction proceeds by successively adding core members and reinforcing rods from the keel to the gunwale when the hull is built in an upright position on a mold suspended from scaffolding. It should be noted that major bulkheads may be of the same construction, as well as a deck and a cabin sole. In bulkhead and sole construction, plywood may be used as additional stiffening material for load bearing surfaces, and for the deck.

In joining bulkheads to the inner hull surface, each reinforcing rod for the bulkhead was bent downward from the weld point of the next higher longitudinal rod and continued to the next lower longitudinal rod and welded into the weld point of the next lower bulkhead and longitudinal rods. A unitary hull and bulkhead construction was obtained by applying the glass cloth to the inner hull surface and continuing it onto the bulkhead surface. This technique may also be employed in making the cabin sole, bulkheads, and deck all one structure of foam core and steel reinforced material.

Spaces may be left free of core material as required for welding the rods forming the bulkheads, sole, or decking to the outer hull structure. Core material may then be added after welding is completed.

Upon completion of the basic hull and deck, with all bulkheads, reinforcing rod stubs for the superstructure may be lengthened by welding additional lengths of rod as required for continuing on with fabrication of the superstructure in the same manner as the hull so that the completed boat structure is one continuous steel-reinforced, foam-core, fiber-glass unit of great strength and rigidity.

Although certain specific materials have been specified for use in fabricating the items of the present invention, it should be noted that the materials used in this fabrication are not considered critical and any materials generally considered satisfactory for a particular use or function may be utilized.

Although exemplary embodiments of the invention have been shown and described, changes and modifications and other embodiments of the invention may be made by one having ordinary skills in the art without necessarily departing from the spirit and scope of the invention.

What is claimed is:

1. A reinforced panel, comprising:
   a reinforcing rod;
   a plurality of core members each having edge portions provided with semi-cylindrical grooves generally conforming to the shape of semi-cylindrical portions of said reinforcing rod, pairs of said core members encompassing and in essentially contiguous contact with said reinforcing rod and having their edge portions sealed and bonded together by a sealant material in abutting relationship with each other and with said reinforcing rod; and
   a sheet of material adhered to said core members by an adherent material.

2. A panel as stated in claim 1 wherein said core members are a foamed polymeric material.

3. A panel as stated in claim 1 wherein said sheet material is a glass cloth and is disposed on both sides of said core members and wherein said adherent material is an epoxy resin cement.

4. A panel as stated in claim 1 wherein said reinforcing rods are steel.

5. A panel as stated in claim 1 wherein said sealant material is an epoxy cement.

6. A panel as stated in claim 1 wherein said reinforcing rods are parallel to the major axis of said panel.

7. A method of constructing a reinforced panel comprising the steps of:
   providing a semi-cylindrical groove generally conforming to the shape of a reinforcing rod in the upper edge of a first core member;
   placing a first reinforcing rod in said groove on said first core member;
   providing semi-cylindrical grooves generally conforming to the shape of said reinforcing rod in the upper and lower edges of a second core member;
   covering said rod and said upper edge of said first core member with an adhesive;

sealing the lower edge of said second core member to the upper edge of said first core member and bonding said reinforcing rod to said core members;

placing a reinforcing rod on the upper edge of said second core member; and adding additional core members and reinforcing rods until a panel of a desired size is obtained.

8. A method of constructing a reinforced panel having a curved surface comprising the steps of:

providing a mold defining said curved surface, said mold having a lower edge and an upper edge;

placing a first core member along said lower edge of said mold, said first core member having an upper edge provided with a semi-cylindrical groove generally conforming to the shape of a reinforcing rod extending the full length of said first core member;

placing a first reinforcing rod in said groove on said first core member;

covering said rod and said upper edge of said first core member with an adhesive;

procuring a second core member having upper and lower edges both provided with semi-cylindrical grooves matching the groove in said first core member in size and shape;

sealing the lower edge of said second core member to the upper edge of said first core member and bonding said reinforcing rod to said core members; and adding additional reinforcing rods and core members in like manner until said mold is covered.

* * * * *